United States Patent [19]
Gilmore

[11] 3,785,701
[45] Jan. 15, 1974

[54] SAFETY BELT SYSTEM
[75] Inventor: William J. Gilmore, Manitou Beach, Mich.
[73] Assignee: American Chain & Cable Company, Inc., New York, N.Y.
[22] Filed: Dec. 1, 1971
[21] Appl. No.: 203,685

[52] U.S. Cl. .............................. 297/385, 297/388
[51] Int. Cl. .............................................. A62b 35/60
[58] Field of Search ........................... 297/385, 388; 57/145, 146, 147, 148, 149

[56] References Cited
UNITED STATES PATENTS
| | | | |
|---|---|---|---|
| 2,855,028 | 10/1958 | Matthews | 297/388 |
| 3,240,082 | 3/1966 | Bratz | 57/145 X |
| 3,131,530 | 5/1964 | Dietz | 57/146 X |
| 1,970,702 | 8/1934 | Kuney | 57/145 X |
| 2,894,366 | 7/1959 | Leckie | 57/149 |
| 3,404,526 | 10/1968 | Thomas | 57/149 |
| 3,243,233 | 3/1966 | Davis | 297/385 X |

Primary Examiner—James T. McCall
Attorney—Pennie, Edmonds, Morton

[57] ABSTRACT

A safety belt system using a bendable cable section having a self-sustaining shape and a flexible strap section. The cable section is fixed on one side of the seat for positioning at the side of the occupant of the seat. The flexible strap section is fixed at the other side of the seat for extending across the seat and the occupant. Fastening means connected to the free ends of the cable and belt are provided for attaching the end of the belt to the cable at the one side of the occupant.

6 Claims, 4 Drawing Figures

PATENTED JAN 15 1974　　3,785,701

INVENTOR
William J. Gilmore
BY Pennie, Edmonds,
Morton, Taylor & Adams
ATTORNEYS

SAFETY BELT SYSTEM

BACKGROUND OF THE INVENTION

Today's automobiles are provided with passenger seat belts as a standard safety item. Most typically, these seat belts are comprised of two strap sections fixed to the framework of the car. The ends of the strap sections are adapted to be brought across the occupant's waist and connected together through means of a buckle mechanism. The straps are constructed of flexible fabric material while the buckle mechanism includes a housing part fixed to one strap and into which a flat metal coupling member, fixed to the other strap, is adapted to be inserted. The buckle mechanism automatically couples the strap sections together upon insertion of the coupling member into the housing. The housing is also provided with some type of release mechanism to permit uncoupling of the straps.

With presently constructed safety belts, the operator is required to use both hands in coupling the strap sections together. For a passenger in the car, this presents no problem. However, the same is not true with respect to the driver. Quite frequently the driver starts driving before attaching the safety belt around his waist. Obviously, the driver's attention to his driving is necessarily distracted while he first locates the ends of the two strap sections. This possibly can be done with one hand at a time by feeling for the strap sections; and in some constructions, the strap sections are adapted to automatically wind up when not in use so that their location is known. In order to couple the strap sections together, however, it is necessary that the driver use both hands. Therefore, he must momentarily take his hands off the wheel of the car. The dangers involved in doing this are apparent.

With presently available seat belts, the difficulties discussed above are generally due to the fact that the strap sections are made of flexible material and will not stay in position for coupling together unless held by the operator. The flexibility is, however, required in order that the belts may be adjusted for different sized occupants. Also, seat belts must be adjustable for different positionings of the driver's seat. In all of today's automobiles, the driver's seat is adjustable so that it can move forward and backward to accommodate occupants of different heights. In addition, some seats can be adjusted vertically. The farther forward the seat or the higher its positioning, the greater the length of seat belt required. Conversely, when the seat is moved back and lowered, a lesser length is required to fit snugly about the occupant. In addition, in automobiles which have the bench type of seat, the strap section to the right of the driver must pass between the bottom and back portions of the seat. This also requires that this section of the seat belt be flexible to accommodate different positionings of the seat.

SUMMARY OF THE INVENTION

With the safety belt system of the present invention, the driver can connect his seat belt with one hand and by simply placing one strap across his waist and attaching it to a coupling member, the location of which is known but adjustable to accommodate different seat positionings.

With applicant's safety belt system, the section to the right of the driver is a flexible cable structure having a bendable, yet self-sustaining shape; that is, the cable can be bent to accommodate different positionings of the seat; and at the same time, its free end to which the coupling member is attached can be placed at the side of the occupant and will remain there until purposely moved to a different location. Thus, in effect, the coupling member remains stationary for purposes of coupling to the other section of the safety belt.

DESCRIPTION OF THE PREFERRED EMBODIMENT

Figure 1:
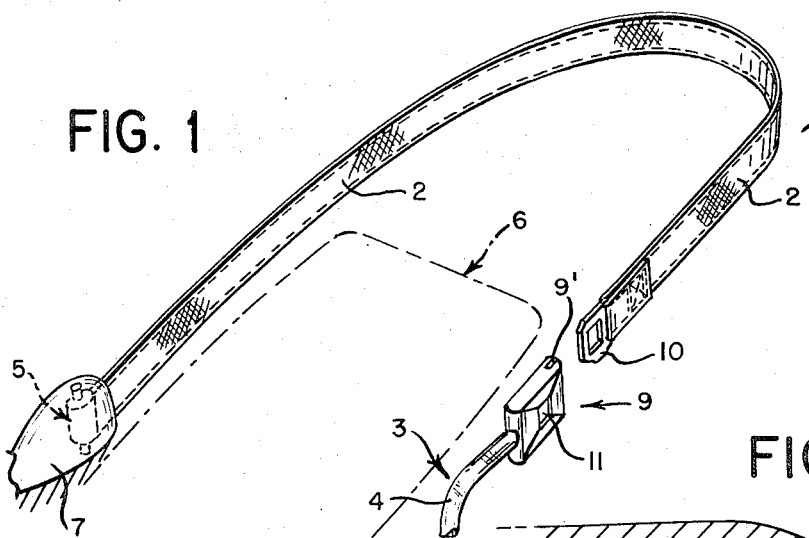
FIG. 1 is a schematic view showing the orientation of the sections of the safety belt system relative to the occupant's position on the seat.

The belt system of the present invention generally includes two sections. The first is a belt section 1 constructed of a conventional fabric strap material 2 while the second is a cable section 3 constructed of a bendable cable structure 4. The belt system is particularly useful for the driver's position in an automobile although it may of course be used for the passenger seats. Where used for the driver, the cable 4 is located to the right of the driver while the flexible strap 2 is located at the driver's left. A suitable automatic rewinding mechanism 5 may be provided for winding the belt neatly at the driver's left side when not in use. The driver's location is represented schematically in FIG. 1 by reference numeral 6.

Figure 2:
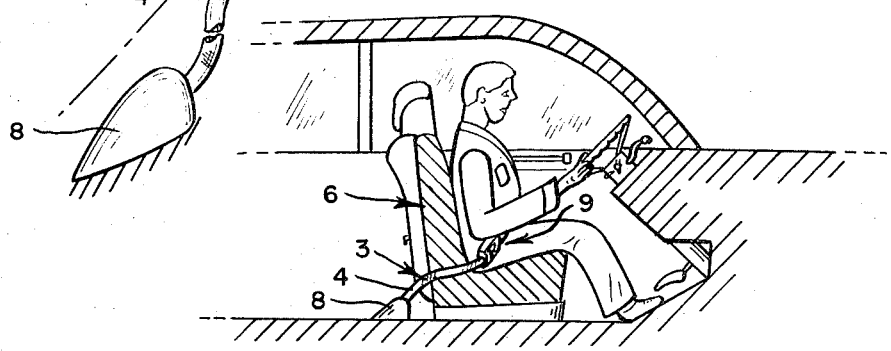
FIG. 2 is a cross-sectional view showing the location of the cable section of the safety belt system relative to a bench seat.

Both sections of the belt system are fixed to the framework of the car by suitable connectors 7 and 8. The flexible cable 4 extends only a short distance on the right side of the driver's location. In FIG. 2, the cable is shown as extending up to slightly above the level of the bottom portion of the seat. FIG. 2 also shows how the cable is routed between the bottom and the back portions of a bench type seat.

A fastening means in the form of a buckle mechanism 9 is fixed to the free end of the cable 4. This buckle mechanism is of conventional construction and is generally comprised of a housing having an opening 9' into which a coupling member 10, fixed to the flexible strap 2, is adapted to be inserted. Insertion of the coupling member automatically effects a connection of the belt sections. A release mechanism, not shown, is provided in the buckle housing so that the connection can be quickly released by pushing a button 11 or by some other suitable means.

From FIGS. 1 and 2 it will be noted that the cable section 3 of the belt system will not extend across the occupant of the seat. It will instead only extend to the occupant's side. The belt section 2 is however constructed with sufficient length so that it may be brought about the occupants waist and connected to the cable section on the occupant's right side. Although the belt section 2 shown in FIG. 1 includes a single strap adapted to be connected across the occupant's waist, this section could also include a shoulder harness strap having its end connected with the strap 2 to the coupling member 10.

With the belt system of the present invention the driver need only grasp the belt section 2, bring it across his body and connect it to the buckle 9 of the cable section. In accordance with the teachings of this invention, this buckle will be at a location known to the driver and he will not have to use his other hand to find it or to hold it while making the connection. The cable has sufficient rigidity to hold the buckle in position while the coupling member 10 is inserted and a connection made. In addition, the cable section of the belt is flexible enough so that it may be properly routed under the back portion of the seat for any positioning of the seat.

Figure 3:
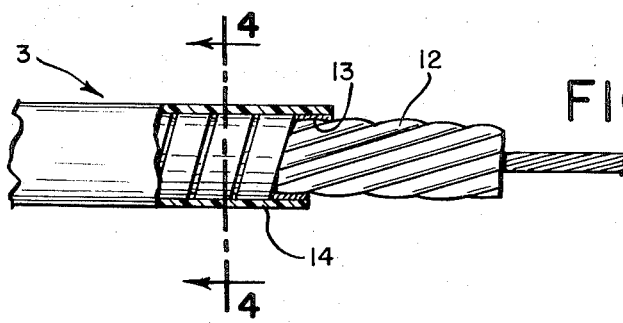
FIG. 3 is a fragmentary side view, partially broken away, of the cable structure used in applicant's seat belt system.
Figure 4:
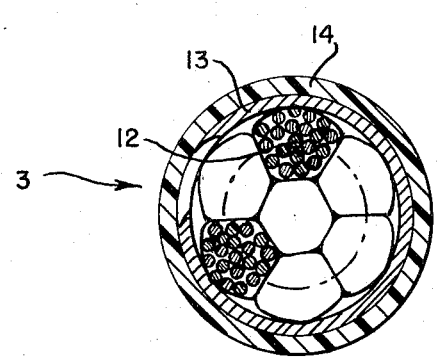
FIG. 4 is a cross-sectional view taken along lines 4—4 of FIG. 3.

FIGS. 3 and 4 show the presently preferred construction of the cable section of the belt. It is comprised of a 7 × 19 galvanized steel aircraft cable 12 made up of helically wound strands. The strands are, in turn, constructed of wires of round cross-sectional shape. The cable has a military specification: MIL C 1511. The wound diameter of the cable is nominally seven thirty-seconds of an inch. This actually measures 0.228 inch.

The cable 12 is helically wrapped with an outer armored covering wire 13. This covering wire has a flat cross-sectional shape with a width of 0.125 inch and a thickness of 0.025 inch. In the preferred construction, this wire is made of steel having a tensile strength of about 150,000 p.s.i. The flat wire is generally softer than the wires of the cable. As shown in FIG. 3, a slight spacing is provided between the convolutions. This spacing is 0.030 inch. The approximate outside diameter of the armored cable structure is 0.282 inch.

To complete the construction of the cable section of the belt, a thermoplastic sheath 14 is placed over the armored wire 13. This provides a protective covering for this section and enhances its appearance.

After the cable is wound and the armored covering wire applied and before the plastic sheath is applied, the entire structure is compacted by feeding through a conventional rotary swaging machine. The compacting of the structure is controlled so that the individual wires of the cable are not appreciably deformed. That is, these wires retain their circular cross-sectional shape although the strands are deformed as shown in FIG. 2. The compacting is also sufficient to deform the flat wire. More particularly, its inner surface is deformed to generally conform to the outer shape of the cable 12. This deformation is clearly shown in FIG. 4. The compacting of the armored cable structure reduces its diameter from 0.282 inch to 0.255 inch.

The degree to which the cable structure is compacted is critical. With little or no compacting, the cable will be flexible but will not retain a bent shape. When the bending force is removed, the cable will flex back to its original position. If, on the other hand, the compacting is excessive, the cable structure will, in effect, act like a rod and not be bendable as a cable. By compacting to a degree producing the deformation shown in FIG. 4, the frictional coaction between the individual wires of the cable and between the wires of the cable with the armored covering wire will hold the cable structure in a bent configuration. Thus, the resulting structure will be flexible enough to bend to permit routing through the seat of the automobile and it will also retain this configuration until changed by the occupant. In addition, the buckle 9 can be positioned at a desired location and will remain stationary while the other section of the safety belt is connected by inserting the coupling member 10 into the buckle 9.

I claim:

1. A safety seat belt system for holding an occupant in a seat mounted on a support comprising:
   a. elongated means attached at one end to said support, said means having a bendable self-sustaining construction for holding the other end at different selected positions on one side of said occupant; said means being a cable structure comprised of:
      1. a cable constructed of a plurality of helically wrapped wires of predetermined cross-sectional shape,
      2. a covering wire helically wrapped about said cable with clearance between the helical convolutions thereof, and
      3. said cable structure being a compacted structure with the wires of the cable having said predetermined cross-sectional shape and the covering wire deformed with the inside surface thereof conforming to the outer contour of said cable;
   b first fastening means fixed to the other end of said elongated means;
   c a flexible belt strap fixed at one end to said support on the other side of said occupant and having a length for extending across said seat and the occupant; and
   d second fastening means attached to the other end of said strap, said second fastening means being adapted to be coupled to said first fastening means upon engagement therewith.

2. A safety seat belt system according to claim 1 wherein:
   a said elongated means is attached to the support on said one side of the occupant and extends to slightly above the level of the bottom portion of said seat.

3. A safety seat belt system according to claim 2 wherein:
   a said cable is comprised of a plurality of helically wrapped strands; and
   b each strand is comprised of wires of round cross-sectional shape.

4. A safety seat belt system according to claim 3 wherein:
   a the covering wire of said cable structure is flat in cross-section.

5. A safety seat belt system according to claim 4 wherein:
   a said cable is a 7 × 19 construction with a total uncompacted diameter of 0.228 inch;
   b said flat wire has a width of 0.125 inch and thickness of 0.025 inch with a spacing between convolutions of 0.030 inch; and
   c said cable structure after compacting has an outside diameter of 0.255 inch.

6. A safety seat belt system according to claim 5 wherein:
   a said cable is constructed of galvanized steel wires; and
   b said covering wire is constructed of steel softer than said wires.

* * * * *